United States Patent
Hsu et al.

(10) Patent No.: US 9,639,271 B2
(45) Date of Patent: May 2, 2017

(54) DATA ALLOCATION METHOD AND DEVICE CAPABLE OF RAPID ALLOCATION AND BETTER EXPLOITATION OF STORAGE SPACE

(71) Applicant: REALTEK SEMICONDUCTOR CORPORATION, Hsinchu (TW)

(72) Inventors: Chao-Yuan Hsu, Taipei (TW); Ting-Yu Wei, Taipei (TW); Chi-Ming Cheng, Taipei (TW); Chen Chen, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/843,543

(22) Filed: Sep. 2, 2015

(65) Prior Publication Data
US 2016/0103614 A1    Apr. 14, 2016

(30) Foreign Application Priority Data
Oct. 9, 2014  (TW) .............................. 103135293 A

(51) Int. Cl.
*G06F 3/06* (2006.01)
(52) U.S. Cl.
CPC .......... *G06F 3/0604* (2013.01); *G06F 3/0631* (2013.01); *G06F 3/0673* (2013.01)
(58) Field of Classification Search
CPC .... G06F 3/0604; G06F 3/0631; G06F 3/0673; G06F 3/06
See application file for complete search history.

(56) References Cited

U.S. PATENT DOCUMENTS 8,271,721 B2 *  9/2012  Hsiao ................... G06F 12/0246
                                                        711/103
8,355,279 B2 *  1/2013  Yoon ..................... G06F 11/1072
                                                        365/185.03
(Continued)

FOREIGN PATENT DOCUMENTS

TW    200745853    12/2007
TW    201312573    3/2013

OTHER PUBLICATIONS

TW 200745853 is published as US2007168638.
TW 201312573 is published as US2013067142.

*Primary Examiner* — Christopher D Birkhimer
(74) *Attorney, Agent, or Firm* — WPAT, P.C., Intellectual Property Attorneys; Anthony King

(57) ABSTRACT

The present invention discloses a data allocation method. An embodiment of this method comprises: preparing a storage space; allocating some of the storage space as a first current page, a second current page, a first next page, and a second next page; comparing a first data amount with a first spare space of the first current page, and comparing a second data amount with a second spare space of the second current page; storing first data in the first current page if the first spare space is enough for the first data amount, or else storing the first data in the first next page; and storing second data in the second current page if the second spare space is enough for the second data amount, or else storing the second data in the second next page, wherein the storage processes for the first and second data are executed simultaneously.

20 Claims, 8 Drawing Sheets

(56) References Cited

U.S. PATENT DOCUMENTS

| | | | | |
|---|---|---|---|---|
| 8,812,804 B2* | 8/2014 | Goss | ................... | G06F 12/1408 |
| | | | | 375/222 |
| 2007/0168638 A1 | 7/2007 | Hepkin et al. | | |
| 2013/0067142 A1 | 3/2013 | Choi et al. | | |
| 2013/0100752 A1* | 4/2013 | Chu | ....................... | G11C 29/44 |
| | | | | 365/201 |
| 2013/0275802 A1* | 10/2013 | Endo | ................... | G06F 11/1076 |
| | | | | 714/6.23 |
| 2014/0189203 A1* | 7/2014 | Suzuki | ................ | G06F 12/0246 |
| | | | | 711/103 |
| 2014/0244912 A1* | 8/2014 | Birk | ................... | G06F 12/0246 |
| | | | | 711/103 |

\* cited by examiner

S140

S142 indicating the first spare space according to a first storage capacity of the first current page and a first write pointer which is operable to indicate the latest write address of a storage unit; and indicating the second spare space according to a second storage capacity of the second current page and a second write pointer

Fig. 1b

S135 — decomposing the reception data into N data streams including the first and second data according to a predetermined rule, in which N is an integer not less than two

Fig. 1c

S145 — executing sorting and/or reassembling procedures for some pieces of data in multiple data streams including the first and second data

Fig. 1d

S190 — detecting whether a number of first allocated next pages among the plurality of next pages is less than a first predetermined number, in which the first allocated next pages include the first next page and are operable to store the first data stream; if the number of the first allocated next pages is less than the first predetermined number, allocating a part of the spare portion as the first next page or as a substitute for the first next page; detecting whether a number of second allocated next pages among the plurality of next pages is less than a second predetermined number, in which the second allocated next pages include the second next page and are operable to store the second data stream; and if the number of the second allocated next pages is less than the second predetermined number, allocating a part of the spare portion as the second next page or as a substitute for the second next page

Fig. 1e

DATA ALLOCATION METHOD AND DEVICE CAPABLE OF RAPID ALLOCATION AND BETTER EXPLOITATION OF STORAGE SPACE

BACKGROUND OF THE INVENTION

1. Field of the Invention

The present invention relates to a data allocation method and device, especially to a data allocation method and device capable of executing allocation instantly and exploiting a storage space efficiently.

2. Description of Related Art

For many electronic devices, receiving and storing digital data is necessary for device operation. However, even though the technique of receiving and storing digital data develops for a long time, it still has some problems. For instance, regarding the technique of receiving and storing multiple data streams, some current art allocates a storage unit of the maximum data storage amount for storing each data of the data streams regardless of the data size, which can execute allocation rapidly but can merely achieve low utilization of the storage space. Some other current art allocates a storage unit of an appropriate data storage amount for storing each data of the data streams, which can make better use of the storage space, but will lead to the fragmentation problem (i.e., the addresses of the storage space for a single piece of data are scattered while the data are segmented by different sizes) after repeated storage space allocation and release, and will lead to slow allocation instead of instant allocation gradually. Some other current art prepares a single storage unit for storing successive pieces of data of each data stream; although this can utilizing the storage space efficiently, in order to meet the requirement for the following data sort and reassembly processes in the worst case, the minimum size of the said single storage unit should be "the window size (i.e., the number of the pieces of data to be retained) multiplied by the expected maximum data amount of a single piece of data". Accordingly, this art will consume a lot of storage resources; and the spare spaces for storing different data streams respectively can not be shared among the storage processes of these data streams, which will lead to the waste of storage resource.

SUMMARY OF THE INVENTION

In view of the problem of the prior arts, an object of the present invention is to provide a data allocation method and device capable of rapid allocation and better exploitation of storage space.

The present invention discloses a data allocation method. An embodiment of the method comprises the following steps: preparing a storage space; allocating a current portion of the storage space as a plurality of current pages including a first current page and a second current page; allocating a next portion of the storage space as a plurality of next pages including a first next page and a second next page; comparing a first data amount of first data with a first spare space of the first current page, and comparing a second data amount of second data with a second spare space of the second current page; if the first spare space is enough for the first data amount, storing the first data in the first current page; if the first spare space is not enough for the first data amount, treating the first current page as a used page, then treating the first next page as the first current page, storing the first data in the first next page which has been treated as the first current page, and allocating a first part of a spare portion of the storage space as the first next page or the substitute thereof; if the second spare space is enough for the second data amount, storing the second data in the second current page; and if the second spare space is not enough for the second data amount, treating the second current page as another used page, then treating the second next page as the second current page, storing the second data in the second next page which has been treated as the second current page, and allocating a second part of the spare portion of the storage space as the second next page or the substitute thereof, wherein the processes for storing the first and second data are executed simultaneously.

The present invention also discloses a data allocation device. An embodiment of the device comprises: a storage space; a data allocating circuit operable to allocate some or all of the storage space as a plurality of current pages and a plurality of next pages in which the current pages include a first current page and a second current page and the next pages include a first next page and a second next page; and a storage decision circuit operable to store a plurality of data streams including first data and second data. The storage decision circuit includes a first storage decision unit and a second storage decision unit. The first storage decision unit is operable to compare a first data amount of the first data with a first spare space of the first current page and then execute the following steps: if the first spare space is enough for the first data amount, storing the first data in the first current page; and if the first spare space is not enough for the first data amount, treating the first current page as a used page, then treating the first next page as the first current page, and storing the first data in the first next page which has been treated as the first current page while a first part of a spare portion of the storage space is allocated by the data allocating circuit as the first next page or the substitute thereof afterwards. The second storage decision unit is operable to compare a second data amount of the second data with a second spare space of the second current page and then execute the following steps: if the second spare space is enough for the second data amount, storing the second data in the second current page; and if the second spare space is not enough for the second data amount, treating the second current page as another used page, then treating the second next page as the second current page, and storing the second data in the second next page which has been treated as the second current page while a second part of the spare portion of the storage space is allocated by the data allocating circuit as the second next page or the substitute thereof afterwards.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1a~FIG. 1e illustrate embodiments of the data allocation method of the present invention.

DETAILED DESCRIPTION OF THE PREFERRED EMBODIMENTS

The following description is written by referring to terms acknowledged in this invention field. If any term is defined in the specification, such term should be explained accordingly.

The present invention comprises a data allocation method and device capable of rapidly achieving data allocation and storage through the allocation, usage and release of a storage space while making the storage space shareable. This invention is applicable to a storage device such as a stationary or portable network communication device (e.g., a Long Term Evolution (LTE) device) for multiple data streams, and is applicable to other types of storage device as long as the consequent implementation is practicable. Besides, the method of the present invention can be in the form of software and/or firmware and carried out by the device of the present invention or its equivalent. In addition, some element of the device of the present invention could be known, and the detail of such element will be omitted while the present disclosure is believed to be enough for understanding and enablement.

Figure 1A:
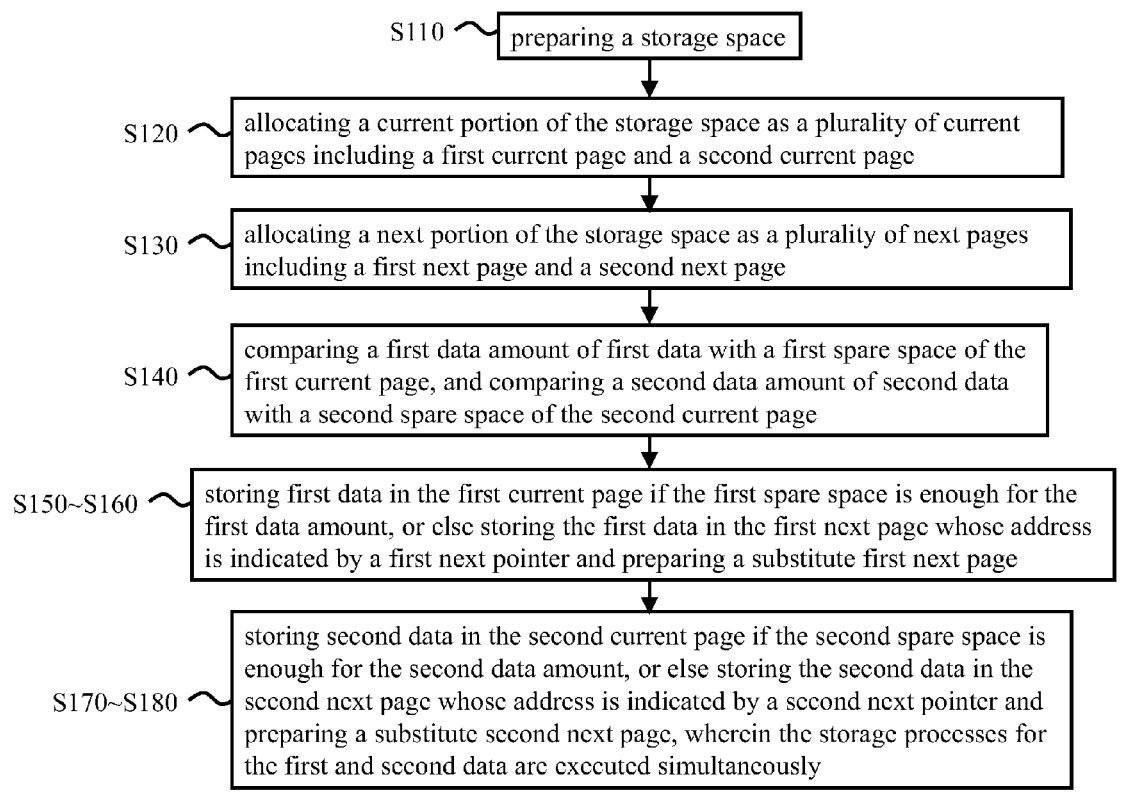

Please refer to FIG. 1a which illustrates an embodiment of the data allocation method of the present invention. This embodiment can be carried out through the data allocation device of the present invention (as it is described in the later description) or the equivalent thereof, can provide a dedicated current storage space and a next storage space for each data stream of multiple data streams in storage application, and can store a piece of data of each data stream in the said current or next storage space according to the size of the piece of data. Therefore, through the features of the dedicated storage spaces, the detection of data size and the allocation of next storage spaces, the present embodiment can execute storage processes for a single data stream or multiple data streams rapidly and concurrently, and can make better use of storage space. In detail, as it is shown in FIG. 1a, the embodiment comprises the following steps:

Step S110: preparing a storage space whose storage capacity is not less than the sum of the capacity of a current portion, the capacity of a next portion and the capacity of a spare portion. In this embodiment, the storage space is a memory or a storage device capable of executing storage space allocation.

Step S120: allocating the said current portion of the storage space as a plurality of current pages including a first current page and a second current page. In this embodiment, the capacity of each current page is not less than a predetermined maximum data amount, so as to make sure that any single piece of data can be stored with one current page. If a current page has stored preceding data and thereby can't receive the whole of a single piece of data, a next page (as it is described in the later description) will be used to store the single piece of data. The said predetermined maximum data amount can be set by those carrying out the present invention in light of their demand or the type of application.

Step S130: allocating the said next portion of the storage space as a plurality of next pages including a first next page and a second next page. In this embodiment, the capacity of each next page is also not less than the predetermined maximum data amount, so as to make sure that any single piece of data can be stored with one next page when the next page is treated as a current page.

Step S140: comparing a first data amount of first data with a first spare space of the first current page, and comparing a second data amount of second data with a second spare space of the second current page. This step is operable to detect whether the spare spaces of the first and second current pages are enough to store the first and second data respectively, so that the following step can make a decision to store the data in the current page or the associated next page. As shown in step S142 of FIG. 1b (while step S142 can be executed by one or both of the first storage decision unit 232 and the second storage decision unit 234 of FIG. 2), the detection of the spare space can be done though the following manner or its equivalent: indicating the first spare space according to a first storage capacity (e.g., the aforementioned predetermined maximum data amount) of the first current page and a first write pointer which is operable to indicate the latest write address of a storage unit; and indicating the second spare space according to a second storage capacity (e.g., the aforementioned predetermined maximum data amount) of the second current page and a second write pointer. The design and utilization of the mentioned write pointer is known in this field, and therefore the detail is omitted.

Step S150: if the first spare space is enough for the first data amount, storing the first data in the first current page.

Step S160: if the first spare space is not enough for the first data amount, treating the first current page as a used page, then treating the first next page as the first current page, storing the first data in the first next page which has been treated as the first current page, and allocating a first part of the aforementioned spare portion of the storage space as the first next page or the substitute thereof. In this step, a first next pointer is used to indicate the address of the first next page, so that this step can use the first next page instead of the first current page instantly to carry out the storage process. Besides, in order to prevent the available page(s) from falling short of the requirement of the following storage process, after the first next page is treated as the first current page, the said first part of the spare portion of the storage space will be allocated as the new first next page (which is also pointed by the first next pointer), or a substitute page of the latest first next page will be treated as the new first next page while the first part of the spare portion will be allocated as the substitute of the new first next page.

Step S170: if the second spare space is enough for the second data amount, storing the second data in the second current page.

Step S180: if the second spare space is not enough for the second data amount, treating the second current page as another used page, then treating the second next page as the second current page, storing the second data in the second next page which has been treated as the second current page, and allocating a second part of the spare portion of the storage space as the second next page or the substitute thereof, wherein the processes for storing the first and second data are executed simultaneously. In this step, a second next pointer is used to indicate the address of the second next page, so that this step can use the second next page in place of the second current page instantly to carry out the storage process. Similarly, in order to prevent the available page(s) from falling short of the requirement of the following storage process, after the second next page is treated as the second current page, the said second part of the spare portion of the storage space will be allocated as the new second next page (which is also pointed by the second next pointer), or a substitute page of the latest second next page will be treated as the new second next page while the second part of the spare portion will be allocated as the substitute of the new second next page.

Based on the above description, the first and second data of step S140 could come from reception data or storage data. When the first and second data come from reception data (e.g., transmitted communication data such as a data block received every predetermined cycle), the present embodiment may further comprise the following steps as shown in step S135 of FIG. 1c (while step S135 can be executed by the data receiver 300 of FIG. 3a): decomposing the reception data into N data streams including the first and second data according to a predetermined rule in which N is an integer not less than two. The predetermined rule here includes a data sorting rule which could be known or self-defined; in an alternative embodiment of the present invention, the predetermined rule could be another kind of rule such as a rule in accordance with the data reception sequence, the source of data, the size of data and etc. The first data here is included in a first data stream of the said N data streams, and the first data stream may further include at least a piece of first preceding data (whose reception time point is earlier than the reception time point of the first data) and/or at least a piece of first following data (whose reception time point is later than the reception time point of the first data) in sequence of transmission. Provided that data sort and/or data reassembly needs to be executed to these pieces of data to recover a whole piece of original data (while these pieces of data could be segmented communication data or the like, and arrive out of order), the present embodiment may further comprise the following steps: executing sorting and/or reassembling processes according to the first data and according to the at least one piece of preceding data and/or the at least one piece of following data to thereby obtain a first arranged data, wherein the number of the total pieces of the first data and the first preceding data and/or the first following data (that is to say the number of the total pieces of data that need to be sorted and/or reassembled) is not more than a predetermined maximum number W which is an integer not less than two. It should be noted that the number P of the aforementioned current and next pages (plus the substitute pages of the next pages, if any) is not more than the value of the data stream number N multiplied by the predetermined maximum number W, so that the waste of storage resource can be avoided. In other words, the page number $P=N \times W$ is usually sufficient for the worst storage case. In practice, the page number P might be less than $N \times W$ as long as the efficacy of storage process is acceptable, so as to conserve storage resource. For instance, P could be equal to or less than $N \times W \times [X/(X+Y)]$ (i.e., $P \leq (N \times W) \times [X/(X+Y)]$) in which both X and Y are positive integers, used for showing the design flexibility of the number P, and determined by those carrying out the present invention in light of their demand. An example of the total page number P is $(1+(N-1) \times A) \times W$ in which A is a number less than one (e.g., $\frac{1}{8}$, $\frac{1}{4}$, $\frac{1}{2}$ or other fractional/decimal number). More specifically, providing A is $\frac{1}{4}$, if the data stream number N is one, the setting of the total page number $P=1 \times W=N \times W$ can satisfy the storage requirement of the worst case; if the data stream number N is two, the setting of the total page number $P=1.25W<N \times W$ can conserve storage resource; and if the data stream number N is three, the total page number $P=1.5W<N \times W$ can also conserve storage resource. Examples with other number(s) of A in association with other data stream numbers N can be derived in light of the above description. Similarly, the aforementioned second data are included in a second data stream of the N data streams, and the second data stream may further include at least a piece of second preceding data (whose reception time point is earlier than the reception time point of the second data) and/or at least a piece of second following data (whose reception time point is later than the reception time point of the second data) in sequence of transmission. If these pieces of data need to be sorted and/or reassembled, steps and settings like those described above could be adopted. Other data (e.g., third data, fourth data and etc.) of the N data streams can be processed in a similar manner.

Please refer to FIG. 1a again. If the present embodiment is employed in processing multiple data streams (including the aforementioned first and second data) in which some pieces of data need to go through data sort and/or data reassembly, the present embodiment will execute sorting and/or reassembling procedures for these pieces of data as shown in step S145 of FIG. 1d (while step S145 can be executed by one or both of the first storage decision unit 232 and the second storage decision unit 234 of FIG. 3a). After the sorted and/or reassembled data are sent to the layer in charge of the following processes, the present embodiment may further comprise the following step to release the used page done with the former storage process: if the data stored in the aforementioned used page or another used page have been sorted and/or reassembled, allowing the used page or the another used page whose data have been sorted and/or reassembled to be treated as some or all of the aforementioned spare portion of the storage space. In addition, providing the data amount of each of the first and second data is not more than a predetermined maximum data amount (in compliance with a communication protocol or other protocols), the present embodiment may make the storage capacity of each of the current and next pages (and the substitute page(s) of the next pages, if any) not less than the predetermined maximum data amount, so as to ensure the successful execution of the storage process. It should be noted that some or all storage capacities of the current and next pages could be the same or different in accordance with the decision of those carrying out the present embodiment. Furthermore, under the design of sufficient data processing and transmission ability, in order to avoid the waste of storage resource, the present embodiment can restrict the total number of the next pages and the substitute thereof to M times the total number of the current pages in which M is a number not less than one (e.g., a number between 1 and 3), or the present embodiment can prepare at least one next page for each current page and prepare S substitute page(s) for each next page in which S is zero or a positive integer (e.g., two).

The present embodiment may further detect whether the page allocation is appropriate to prevent the available pages from falling short of demand. For instance, referring to FIG. 1a again, if the first data are derived from a first data stream and the second data are derived from a second data stream as shown in FIG. 3b, the present embodiment may further comprise the following steps as shown in step S190 of FIG. 1e (while step S190 can be executed by the data allocating circuit 220): periodically or intermittently detecting whether the number of first allocated next pages (i.e., the number of the aforementioned first next page and the substitute thereof operable to store the first data stream) is less than a first predetermined number in which the first allocated next pages include the first next page; if the number of the first allocated next pages is less than the first predetermined number, allocating a part of the spare portion as the first next page or the substitute thereof; periodically or intermittently detecting whether the number of second allocated next pages (i.e., the number of the aforementioned second next page and the substitute thereof operable to store the second data stream) is less than a second predetermined number in which the second allocated next pages include the second next page; and if the number of the second allocated next pages is less than the second predetermined number, allocating a part of the spare portion as the second next page or the substitute thereof. In the above instance, the timing for executing the periodic or intermittent detection should be proper to prevent the next pages from being insufficient; moreover, in order to avoid the waste of storage resource, each of the numbers of the first and second allocated next pages could be, but not limited to, a positive integer not more than three, and each of the first and second predetermined numbers could be, but not limited to, a positive integer not more than three as well.

Figure 2:
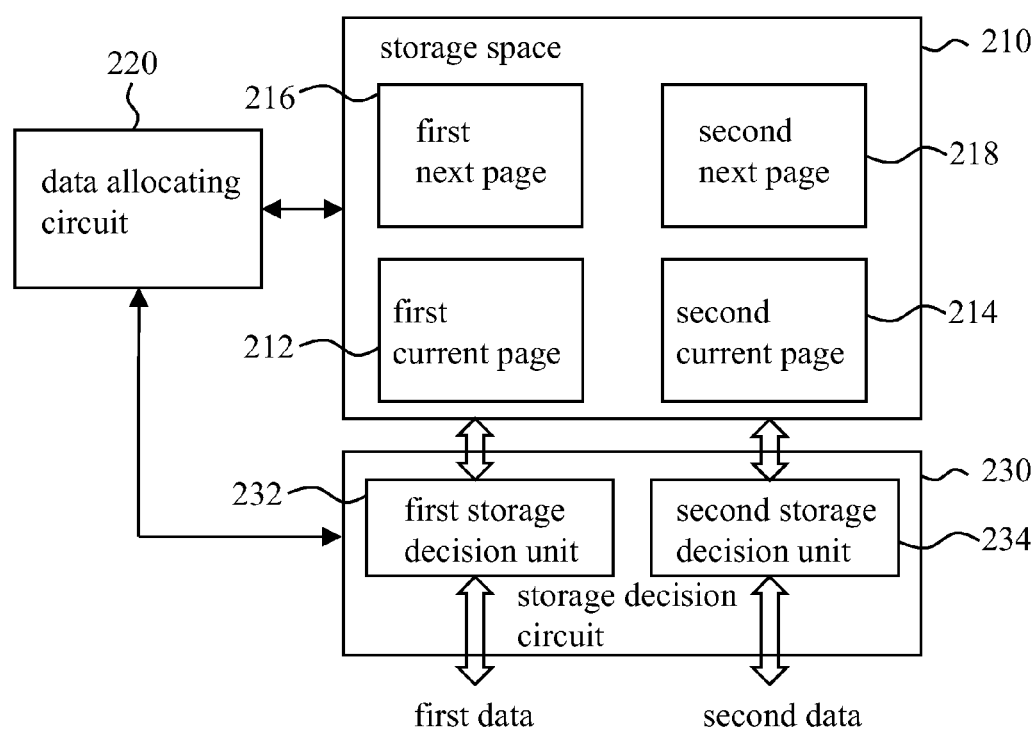
FIG. 2 illustrates an embodiment of the data allocation device of the present invention.

In addition to the fore-disclosed data allocation method, the present invention also discloses a data allocation device capable of executing the method of the present invention or its equivalent. As it is shown in FIG. 2, in an embodiment of the present invention, the data allocation device 200 comprises: a storage space 210 (such as a memory or other types of storage device capable of executing storage space allocation) whose capacity is not less than the sum of the capacities of a current portion, a next portion and a spare portion in which the current, next and spare portions pertain to the storage space after some or all of the storage space is allocated; a data allocating circuit 220 operable to allocate some or all of the storage space as a plurality of current pages and a plurality of next pages in which the current pages include a first current page 212 and a second current page 214 and the next pages include a first next page 216 and a second next page 218; and a storage decision circuit 230 (e.g., hardware or the combination of hardware and software/firmware, such as a circuit including a plurality of logic channels in charge of data reception and processing) operable to execute the storage processes of a plurality of data streams including first data and second data. The storage decision circuit 230 includes a first storage decision unit 232 and a second storage decision unit 234. The first storage decision unit 232 is operable to compare a first data amount of the first data with a first spare space of the first current page 212 and then execute the following steps: if the first spare space is enough for the first data amount, storing the first data in the first current page 212; and if the first spare space is not enough for the first data amount, treating the first current page 212 as a used page, then treating the first next page 216 as the first current page 212, and storing the first data in the first next page 216 which has been treated as the first current page 212. Afterwards, a first part of the aforementioned spare portion of the storage space 210 is allocated by the data allocating circuit 220 as the first next page 216 or the substitute thereof. It should be noted that the first storage decision unit 232 may detect the first spare space according to a first storage capacity of the first current page 212 and a first write pointer, and detect the address of the first next page 216 according to a first next pointer. The detail about the first write pointer and the first next pointer has been explained in the preceding paragraphs. Similarly, the second storage decision unit 234 is operable to compare a second data amount of the second data with a second spare space of the second current page 214 and then execute the following steps: if the second spare space is enough for the second data amount, storing the second data in the second current page 214; and if the second spare space is not enough for the second data amount, treating the second current page 214 as another used page, then treating the second next page 218 as the second current page 214, and storing the second data in the second next page 218 which has been treated as the second current page 214. Afterwards, a second part of the spare portion of the storage space 210 is allocated by the data allocating circuit 220 as the second next page 218 or the substitute thereof. It should be noted that the second storage decision unit 234 may detect the second spare space according to a second storage capacity of the second current page 214 and a second write pointer, and detects the address of the second next page 218 according to a second next pointer. The explanation about the second write and next pointers could be found in the description of the method embodiments.

Figure 3A:
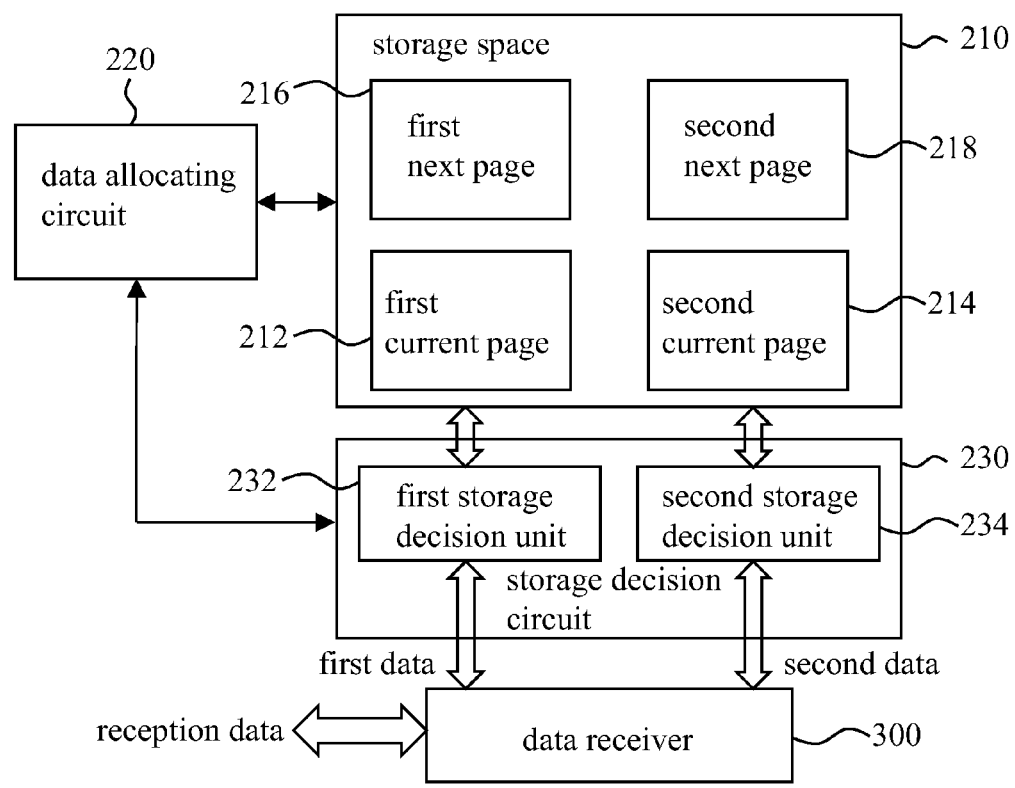
FIG. 3a~FIG. 3b illustrate other embodiments of the data allocation device of the present invention.
Figure 3B:
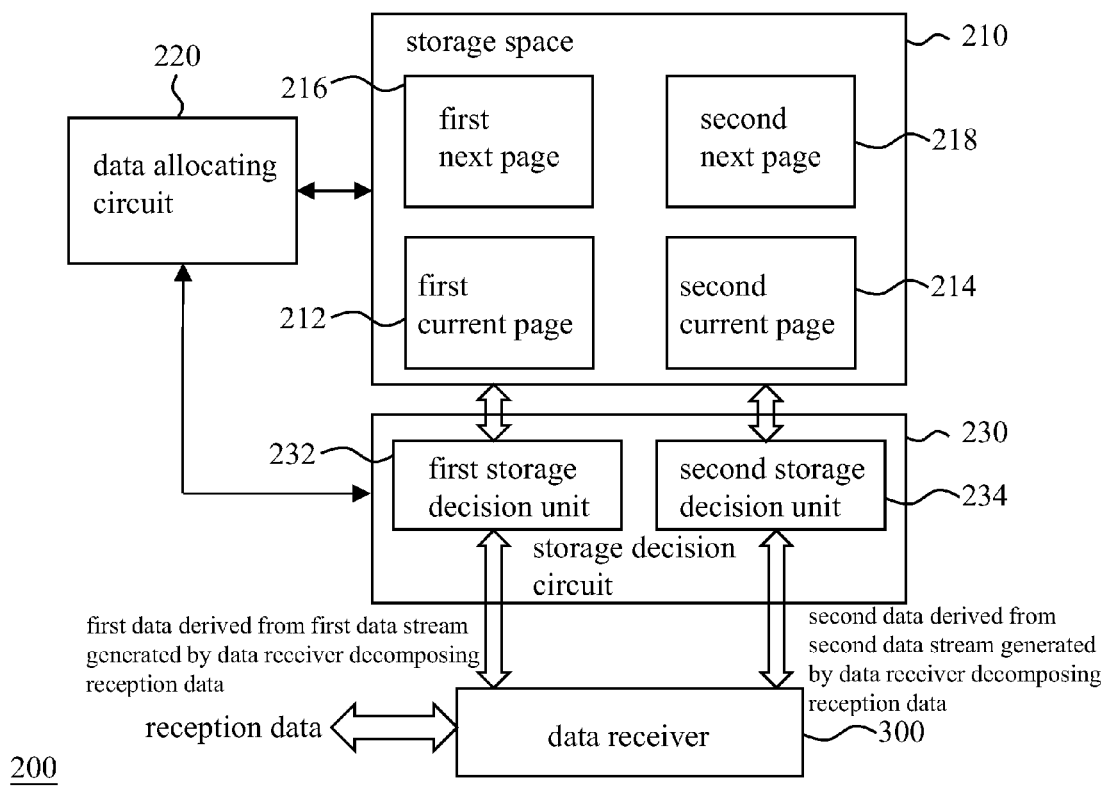

Based on the above, if the first and second data come from reception data (e.g., transmitted communication data), the data allocation device 200 as shown in FIG. 3a may further comprise: a data receiver 300 operable to decompose the reception data into N data streams (including the first and second data) according to a predetermined rule in which N is an integer not less than two and the detail of the predetermined rule could be found in the description of the method embodiments. In addition, the first data here is included in a first data stream of the said N data streams, and the first data stream may further include at least a piece of first preceding data (whose reception time point is earlier than the reception time point of the first data) and/or at least a piece of first following data (whose reception time point is later than the reception time point of the first data) in sequence of transmission. Provided that these pieces of data need to be sorted and/or reassembled to reduce fragmentation or enhance the exploitation of storage space, the first storage decision unit 232 will carry out sorting and/or reassembling processes according to the first data and according to the at least one piece of preceding data and/or the at least one piece of following data to thereby obtain a first arranged data, wherein the number of the total pieces of the first data and the first preceding data and/or the first following data (that is to say the number of the total pieces of data that need to be sorted and/or reassembled) is not more than a predetermined maximum number W which is an integer not less than two. The number P of the aforementioned current and next pages (plus the substitute page(s) of the next pages, if any) is not more than the value of the data stream number N multiplied by the predetermined maximum number W. As it is suggested in the method embodiments, the page number P might be less than N×W to conserve storage resource. For instance, the number P could be equal to or less than N×W×[X/(X+Y)] (i.e., P≤(N×W)×[X/(X+Y)]) in which both X and Y are positive integers and the explanation thereof could be found in the description of the method embodiments. In another instance, the total page number P is (1+(N−1)×A)×W, and this instance is also well explained in the description of the method embodiments. Of course, the second storage decision unit 234 can carry out similar sorting and/or reassembling processes.

Since the storage decision circuit 230 is capable of executing sorting and/or reassembling processes according to multiple data streams, if the data stored in the aforementioned used page or another used page have been sorted and/or reassembled, the first and second storage decision units 232, 234 may return the used page or the another used page whose data have been sorted and/or reassembled to the aforementioned spare portion of the storage space, so as to release the used page done with the former storage process for future use. In addition, according to some communication protocol or other protocols, the data amount of each of the first and second data is not more than a predetermined maximum data amount, and thus the data allocating circuit 220 may make the storage capacity of each of the current and next pages (and the substitute page(s) of the next pages, if any) not less than the predetermined maximum data amount when executing page allocation, so as to ensure the successful execution of the storage process. It should be noted that some or all storage capacities of the current and next pages could be the same or different. Furthermore, if the first data are or pertain to a first data stream and the second data are or pertain to a second data stream, in order to prevent the pages available for ongoing and coming storage processes from being insufficient, the data allocating circuit 220 periodically or intermittently executes the following steps: detecting whether the number of first allocated next pages (i.e., the number of the aforementioned first next page 216 and the substitute thereof operable to store the first data stream) is less than a first predetermined number in which the first allocated next pages include the first next page 216; if the number of the first allocated next pages is less than the first predetermined number, allocating a part of the spare portion of the storage space 210 as the first next page 216 or the substitute thereof; detecting whether the number of second allocated next pages (i.e., the number of the aforementioned second next page 218 and the substitute thereof operable to store the second data stream) is less than a second predetermined number in which the second allocated next pages include the second next page 218; and if the number of the second allocated next pages is less than the second predetermined number, allocating a part of the spare portion as the second next page 218 or the substitute thereof. It should be noted that each of the numbers of the first and second allocated next pages could be, but not limited to, a positive integer not more than three, so as to avoid the waste of storage resource.

Since those of ordinary skill in the art can appreciate the detail and modification of the device embodiments by referring to the explanation of the fore-described method embodiments, which implies that the primary and subordinate features of the method embodiments can be applied to the device embodiments in a reasonable manner, therefore repeated and redundant description is omitted while the present disclosure is believed to be enough for understanding and enablement. Furthermore, the step sequence and the shape, size, and ratio of any element in the disclosed figures are just exemplary for understanding, not limitations in the scope of this invention. Moreover, the terms such as "current", "next", "spare", "used", "first", "second" and etc. could be merely used for distinguishing objects or events of identical or analogous characteristics in this specification.

It should be noted that although most of the above-disclosed embodiments are related to multiple data streams, the present invention is also adequate for processing a single data stream. It should also be noted that each embodiment in this specification includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

In summary, the data allocation method and device of the present invention are operable to allocate some or all of a storage space as dedicated current and next pages for each data stream, and operable to make data storage process efficient and make the spare portion of storage space shareable. Besides, no matter the present invention is employed in storing a single data stream or multiple data streams, the advantages of rapid storage processes, efficient storage space exploitation, and shareable storage resource can be accomplished.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A data allocation method carried out by a data allocation device, comprising the following steps:
   preparing a storage space;
   allocating a current portion of the storage space as a plurality of current pages including a first current page and a second current page;
   allocating a next portion of the storage space as a plurality of next pages including a first next page and a second next page;
   comparing a first data amount of first data with a first spare space of the first current page, and comparing a second data amount of second data with a second spare space of the second current page;
   if the first spare space is enough for the first data amount, storing the first data in the first current page;
   if the first spare space is not enough for the first data amount, treating the first current page as a used page, then treating the first next page as the first current page, storing the first data in the first next page which has been treated as the first current page, and allocating a first part of a spare portion of the storage space as the first next page or as a substitute for the first next page;
   if the second spare space is enough for the second data amount, storing the second data in the second current page; and
   if the second spare space is not enough for the second data amount, treating the second current page as another used page, then treating the second next page as the second current page, storing the second data in the second next page which has been treated as the second current page, and allocating a second part of the spare portion of the storage space as the second next page or as a substitute for the second next page,
   wherein the processes for storing the first and second data are executed simultaneously.

2. The data allocation method of claim 1, further comprising: decomposing reception data into N data streams including the first and second data according to a predetermined rule in which the N is an integer not less than two.

3. The data allocation method of claim 2, further comprising: obtaining first arranged data by executing data sort and/or data reassembly according to at least one of the first data, at least a piece of first preceding data and at least a piece of first following data, wherein the number of the total pieces of the at least one of the first data, the first preceding data and the first following data is not more than a predetermined maximum number W, the W is an integer not less than two, and a number P of the current and next pages is not more than the value of N multiplied by W.

4. The data allocation method of claim 3, wherein the number P is equal to the value of $(1+(N-1)\times A)\times W$ in which the A is a number less than one.

5. The data allocation method of claim 1, further comprising: executing data sort and/or data reassembly according to a plurality of data streams including the first data and the second data.

6. The data allocation method of claim 5, further comprising: if the data stored in the used page or the another used page have been sorted and/or reassembled, allowing the used page or the another used page whose data have been sorted and/or reassembled to be treated as at least some of the spare portion of the storage space.

7. The data allocation method of claim 1, wherein each of the first and second data amounts is not more than a predetermined maximum data amount, and the storage capacity of each of the current and next pages is not less than the predetermined maximum data amount.

8. The data allocation method of claim 1, wherein the number of the next pages is M times the number of the current pages in which the M is not less than one and not more than 3.

9. The data allocation method of claim 1, wherein the first data are derived from a first data stream, the second data are derived from a second data stream, and the data allocation method further comprises the following steps:
  detecting whether a number of first allocated next pages among the plurality of next pages is less than a first predetermined number, in which the first allocated next pages include the first next page and are operable to store the first data stream;
  if the number of the first allocated next pages is less than the first predetermined number, allocating a part of the spare portion as the first next page or as a substitute for the first next page;
  detecting whether a number of second allocated next pages among the plurality of next pages is less than a second predetermined number, in which the second allocated next pages include the second next page and are operable to store the second data stream; and
  if the number of the second allocated next pages is less than the second predetermined number, allocating a part of the spare portion as the second next page or as a substitute for the second next page.

10. The data allocation method of claim 9, wherein each of the numbers of the first and second allocated next pages is a positive integer not more than 3.

11. The data allocation method of claim 1, further comprising:
  indicating the first spare space according to a first storage capacity of the first current page and a first write pointer; and
  indicating the second spare space according to a second storage capacity of the second current page and a second write pointer.

12. The data allocation method of claim 1, further comprising:
  indicating the address of the first next page through a first next pointer; and
  indicating the address of the second net page through a second next pointer.

13. A data allocation device, comprising:
  a storage space;
  a data allocating circuit operable to allocate some or all of the storage space as a plurality of current pages and a plurality of next pages in which the current pages include a first current page and a second current page and the next pages include a first next page and a second next page; and
  a storage decision circuit operable to store a plurality of data streams including first data and second data, including:
    a first storage decision unit operable to compare a first data amount of the first data with a first spare space of the first current page and then execute the following steps:
      if the first spare space is enough for the first data amount, storing the first data in the first current page; and
      if the first spare space is not enough for the first data amount, treating the first current page as a used page, then treating the first next page as the first current page, and storing the first data in the first next page which has been treated as the first current page while a first part of a spare portion of the storage space is allocated by the data allocating circuit as the first next page or as a substitute for the first next page afterwards; and
    a second storage decision unit operable to compare a second data amount of the second data with a second spare space of the second current page and then execute the following steps:
      if the second spare space is enough for the second data amount, storing the second data in the second current page; and
      if the second spare space is not enough for the second data amount, treating the second current page as another used page, then treating the second next page as the second current page, and storing the second data in the second next page which has been treated as the second current page while a second part of the spare portion of the storage space is allocated by the data allocating circuit as the second next page or as a substitute for the second next page afterwards.

14. The data allocation device of claim 13, further comprising:
  a data receiver operable to decompose reception data into the plurality of data streams according to a predetermined rule in which the number of the data streams is N being an integer not less than two.

15. The data allocation device of claim 14, wherein the first storage decision unit further obtains first arranged data by executing data sort and/or data reassembly according to at least one of the first data, at least a piece of first preceding data and at least a piece of first following data, wherein the number of the total pieces of the at least one of the first data, the first preceding data and the first following data is not more than a predetermined maximum number W, the W is an integer not less than two, and the number P of the current and next pages is not more than the value of N multiplied by W.

16. The data allocation device of claim 15, wherein the number P is equal to the value of $(1+(N-1)\times A)\times W$ in which the A is a number less than one.

17. The data allocation device of claim 13, wherein the storage decision circuit executes data sort and/or data reassembly according to the plurality of data streams, and if the data stored in the used page or the another used page have been sorted and/or reassembled, the storage decision circuit allows the used page or the another used page whose data have been sorted and/or reassembled to be at least some of the spare portion of the storage space.

18. The data allocation device of claim 13, wherein each of the first and second data amounts is not more than a predetermined maximum data amount, and each of the capacities of the current and next pages is not less than the predetermined maximum data amount.

19. The data allocation device of claim 13, wherein the first data are derived from a first data stream, the second data are derived from a second data stream, and the data allocating circuit further executes the following steps:
  detecting whether a number of first allocated next pages among the plurality of next pages is less than a first predetermined number, in which the first allocated next pages include the first next page and are operable to store the first data stream;

if the number of the first allocated next pages is less than the first predetermined number, allocating a part of the spare portion as the first next page or as a substitute for the first next page;

detecting whether a number of second allocated next pages among the plurality of next pages is less than a second predetermined number, in which the second allocated next pages include the second next page and are operable to store the second data stream; and if the number of the second allocated next pages is less than the second predetermined number, allocating a part of the spare portion as the second next page or as a substitute for the second next page.

20. The data allocation device of claim 13, wherein the first storage decision unit detects the first spare space according to a first storage capacity of the first current page and a first write pointer, and detects the address of the first next page according to a first next pointer; and the second storage decision unit detects the second spare space according to a second storage capacity of the second current page and a second write pointer, and detects the address of the second next page according to a second next pointer.

* * * * *